United States Patent
Yamashiro et al.

(10) Patent No.: US 11,473,939 B2
(45) Date of Patent: Oct. 18, 2022

(54) CRANK ANGLE DETECTION DEVICE FOR ENGINE

(71) Applicant: HONDA MOTOR CO., LTD., Tokyo (JP)

(72) Inventors: Hayato Yamashiro, Wako (JP); Kazuya Tajiri, Wako (JP); Nozomi Okada, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 331 days.

(21) Appl. No.: 16/813,064

(22) Filed: Mar. 9, 2020

(65) Prior Publication Data
US 2020/0292358 A1    Sep. 17, 2020

(30) Foreign Application Priority Data

Mar. 15, 2019    (JP) .............................. JP2019-048028

(51) Int. Cl.
| | | |
|---|---|---|
| *F16F 15/28* | (2006.01) | |
| *G01D 5/248* | (2006.01) | |
| *F02D 41/00* | (2006.01) | |
| *F16C 41/00* | (2006.01) | |
| *F16C 3/06* | (2006.01) | |

(52) U.S. Cl.
CPC .......... *G01D 5/248* (2013.01); *F02D 41/009* (2013.01); *F16C 3/06* (2013.01); *F16C 41/007* (2013.01)

(58) Field of Classification Search
CPC ..... F02D 41/009; G01M 15/06; G01M 15/02; F16C 3/30; F16C 3/22; F16C 3/06; F16C 41/007; F02B 77/085; F02B 77/087; F16F 15/26; F16F 15/262
See application file for complete search history.

(56) References Cited

U.S. PATENT DOCUMENTS

| | | | |
|---|---|---|---|
| 9,222,361 B2 * | 12/2015 | Steinbauer | F01C 20/06 |
| 2011/0197703 A1 * | 8/2011 | Badre-Alam | F01D 25/04 |
| | | | 416/1 |
| 2017/0016394 A1 * | 1/2017 | Scholtes | F02P 7/0675 |

FOREIGN PATENT DOCUMENTS

| | | | |
|---|---|---|---|
| CN | 201730692 U | * | 2/2011 |
| CN | 106704005 A | * | 5/2017 |
| JP | 2003-172168 A | | 6/2003 |

(Continued)

OTHER PUBLICATIONS

JP 2010216455 A English Translation.*

(Continued)

*Primary Examiner* — George C Jin
*Assistant Examiner* — Teuta B Holbrook
(74) *Attorney, Agent, or Firm* — Carrier Blackman & Associates, PC; Joseph P. Carrier; William D. Blackman

(57) ABSTRACT

A crank angle detection device for an engine capable of achieving downsizing and enhancing appearance of the engine is provided. A crank angle detection device for an engine that includes a pulsar ring including a plurality of detection portions and rotating coaxially with a crank shaft of the engine, and a sensor detecting a passage state of the detection portions. Here, the pulsar ring is fixed to a crank web of the crank shaft. A weight for adjusting inertia balance of the crank shaft is fixed to the crank web arranged close to an end of the crank shaft in an axial direction. The weight has a shape obtained by increasing thickness of a part of the pulsar ring.

14 Claims, 10 Drawing Sheets

(56) References Cited

FOREIGN PATENT DOCUMENTS

| JP | 2006-063836 A | | 3/2006 | |
|----|---------------|---|--------|---|
| JP | 2010-216455 A | | 9/2010 | |
| JP | 2010216455 A | * | 9/2010 | |
| JP | 2011-033003 A | | 2/2011 | |
| JP | 2013245583 A | * | 12/2013 | |
| JP | 2018-168826 A | | 11/2018 | |
| WO | WO-2012069195 A2 | * | 5/2012 | ................ F01C 1/22 |
| WO | WO-2012069196 A2 | * | 5/2012 | ................ F01C 1/22 |

OTHER PUBLICATIONS

JP 2013245583 English Translation.*
Office Action issued in corresponding Japanese Patent Application No. 2019-048028, dated Mar. 24, 2021.
Office Action issued in corresponding Japanese Patent Application No. 2019-048028, dated Jan. 6, 2021.

* cited by examiner

CRANK ANGLE DETECTION DEVICE FOR ENGINE

BACKGROUND

1. Technical Field

The present invention relates to a crank angle detection device for an engine, and in particular, relates to a crank angle detection device for an engine to detect an angle of a crank shaft using a pulsar sensor detecting passage of pulsar teeth.

2. Description of the Background

Traditionally, there has been known a crank angle detection device to detect a crank angle used for ignition control and fuel injection control of an engine, in addition to for calculation of engine rotation speed.

Patent Literature 1 discloses a crank angle detection device to detect a passage state of pulsar teeth with a pulsar sensor formed of a Hall element and the like, the pulsar teeth being formed on an outer circumferential face of a flywheel attached to an end of a crank shaft.

CITATION LIST

Patent Literature

Patent Literature 1: Japanese Patent Laid-open Application No. 2011-33003

BRIEF SUMMARY

According to the configuration of Patent Literature 1, since the pulsar sensor is required to be arranged at a position opposed to the outer circumferential face of the flywheel having a large diameter, there have been problems that a crank case and a case cover are apt to be upsized and that the pulsar sensor exposed outside deteriorates appearance of an engine. Even in a case that pulsar teeth are formed on an outer rotor of a generator arranged at an end of the crank shaft, the problems similar to the above occur. Further, in a case that the pulsar ring is arranged at the end of the crank shaft, an engine is apt to have a larger dimension in the crank shaft direction. Thus, there has been some room left for improvement in configuration of a crank angle detection device.

An object of the present invention is to provide a crank angle detection device for an engine capable of achieving downsizing and enhancing appearance of the engine.

To achieve the abovementioned object, the present invention provides a crank angle detection device for an engine, including:

a pulsar ring (70) including a plurality of detection portions (71), the pulsar ring (70) configured to rotate coaxially with a crank shaft (50) of the engine (E); and
a sensor (37) configured to detect a passage state of the detection portions (71), wherein
the pulsar ring (70) is fixed to a crank web (53) of the crank shaft (50), and a weight (W) for adjusting inertia balance of the crank shaft (50) is arranged at the pulsar ring (70).

As a second feature, the pulsar ring (70) is fixed to the crank web (53) arranged close to an end of the crank shaft (50) in an axial direction.

As a third feature, the weight (W) has a shape obtained by increasing thickness of a part of the pulsar ring (70).

As a fourth feature, the weight (W) is integrated with the pulsar ring (70).

As a fifth feature, the weight (W) is formed of a material or a member different from that of the pulsar ring (70).

As a sixth feature, a lightening hole (75) is formed at the pulsar ring (70) at an area where the weight (W) is not arranged.

As a seventh feature, the pulsar ring (70) is fixed to the crank web (53) using a fastening member (82).

As an eighth feature, a head part of each fastening member (82) and a surface of the weight (W) are flush in a state that the pulsar ring (70) is fixed to the crank web (53).

Further, as a ninth feature, through-holes (74) allowing the fastening members (82) to pass therethrough are formed at the pulsar ring (70) on a concentric circle at regular intervals, and the weight (W) is arranged between the through-holes (74).

According to the first feature, provided is a crank angle detection device for an engine, including: a pulsar ring (70) including a plurality of detection portions (71), the pulsar ring (70) configured to rotate coaxially with a crank shaft (50) of the engine (E); and a sensor (37) configured to detect a passage state of the detection portions (71), wherein the pulsar ring (70) is fixed to a crank web (53) of the crank shaft (50), and a weight (W) for adjusting inertia balance of the crank shaft (50) is arranged at the pulsar ring (70). Accordingly, since the weight is arranged at the pulsar ring, the inertia balance of the crank shaft can be adjusted while maintaining length and weight of the crank shaft even when thickness of the crank web is reduced for the pulsar ring being attached thereto. According to the above, owing to that the pulsar ring is arranged at a position on the inner side of the crank shaft end without increasing engine dimensions in the crank shaft direction and the pulsar sensor is arranged at a position on the inner side of the crank shaft end, the crank case and the crank case cover can be prevented from being upsized and the appearance of the engine can be enhanced.

According to the second feature, the pulsar ring (70) is fixed to the crank web (53) arranged close to an end of the crank shaft (50) in an axial direction. Accordingly, regarding the crank shaft including a plurality of crank webs, the pulsar ring can be attached later to the assembled crank shaft, so that operational man-hours are reduced and maintenance is facilitated. Further, compared to a configuration in which the pulsar ring is arranged at a crank web around the center of the crank shaft, attaching operation and maintenance of the sensor protruding from an outer wall of the crank case are facilitated.

According to the third feature, the weight (W) has a shape obtained by increasing thickness of a part of the pulsar ring (70). Accordingly, the weight can be arranged without changing a profile of the pulsar ring.

According to the fourth feature, the weight (W) is integrated with the pulsar ring (70). Accordingly, owing to that the weight-arranged pulsar ring is formed as a machined component or a sintered component, accuracy of dimensions and weight of the pulsar ring can be improved.

According to the fifth feature, the weight (W) is formed of a material or a member different from that of the pulsar ring (70). Accordingly, for example, the main body is formed of a low density material and the weight is formed of a high density material, so that weight difference can be enlarged.

According to the sixth feature, a lightening hole (75) is formed at the pulsar ring (70) at an area where the weight (W) is not arranged. Accordingly, weight difference with respect to a portion where the weight is arranged is enlarged, so that thinning and downsizing of the pulsar ring can be achieved.

According to the seventh feature, the pulsar ring (70) is fixed to the crank web (53) using fastening members (82). Accordingly, attaching operation of the pulsar ring is facilitated and weight corresponding to the amount of thickness of the head part of the fastening member can be ensured while avoiding interference with the crank case and the like. Further, when the pulsar ring and the weight are arranged separately, the both can be jointly fastened to the crank web.

According to the eighth feature, a head part of each fastening member (82) and a surface of the weight (W) are flush in a state that the pulsar ring (70) is fixed to the crank web (53). The weight can be arranged by maximally utilizing space prepared for the fixing process of the fastening members.

According to the ninth feature, through-holes (74) allowing the fastening members (82) to pass therethrough are formed at the pulsar ring (70) on a concentric circle at regular intervals, and the weight (W) is arranged between the through-holes (74). Accordingly, a portion having largest inertia force due to the weight is arranged between the through-holes, so that the weight can be simplified in shape.

DETAILED DESCRIPTION

Figure 1:
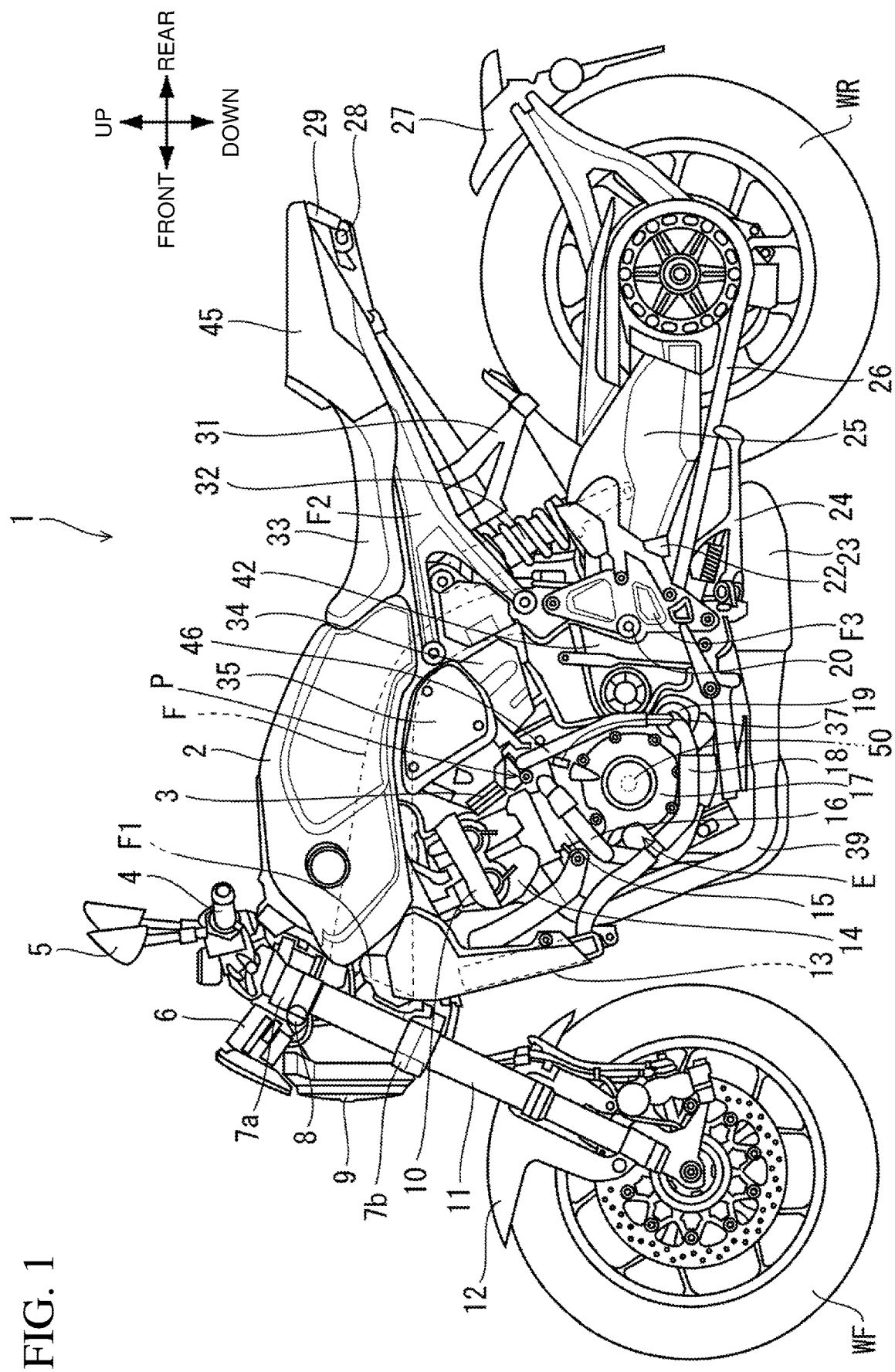
FIG. 1 is a left side view of a motorcycle 1 to which a crank angle detection device for an engine according to an embodiment of the present invention is applied.

In the following, description will be provided on preferable embodiments of the present invention with reference to the drawings. FIG. 1 is a left side view of a motorcycle 1 to which a crank angle detection device for an engine according to an embodiment of the present invention is applied. The motorcycle 1 is a straddle type vehicle in which drive force of a power unit P configured of an engine E and a transmission integrally arranged is transmitted to a rear wheel WR via a drive chain 26.

A stem shaft which connects a top bridge 7*a* and a bottom bridge 7*b* is axially supported in a swingable manner by a head pipe F1 fixed to a front end of a vehicle body frame F. Owing to that a right-left pair of front forks 11 axially supporting the front wheel WF in a rotatable manner are fixed to the top bridge 7*a* and the bottom bridge 7*b*, the front wheel WF is supported as being capable of performing steering. A meter unit 6 and a head light 9 are arranged in front of the front forks 11. A front fender 12 covering an upper part of the front wheel WF and a right-left pair of front blinker units 8 are attached to the front forks 11.

A pivot frame F3 which supports a pivot 20 axially supporting a swing arm 25 in a swingable manner is connected to a rear-lower part of the vehicle body frame F. Steps 22 on which rider's feet are placed are arranged behind the pivot frame F3 and a side stand 24 is axially supported by the pivot frame F3 at the lower end thereof in a swingable manner. The swing arm 25 axially supporting the rear wheel WR in a rotatable manner is suspended from the vehicle body frame F through a rear cushion 32. A rear fender 27 also serving as a holder for a license plate is attached to a rear end of the swing arm 25.

The power unit P suspended from the vehicle body frame F has a configuration in which an in-line four-cylinder engine E and the multistep transmission are integrated. A cylinder head 14 is fixed to an upper part of a cylinder-integrated crank case 15 axially supporting a crank shaft 50 and a cylinder head cover 10 is fixed to an upper part of the cylinder head 14. A throttle body 3 including a fuel injection device is connected to an intake port on a rear face of the cylinder head 14 and an exhaust pipe 39 continuing to a muffler 23 at a rear part of a vehicle body is connected to an exhaust port on a front face of the cylinder head 14. An air cleaner box 34 is connected to the throttle body 3 on the rear side thereof and a right-left pair of side covers 35 are attached to side faces of the air cleaner box 34.

A fuel tank 2 having a shape straddling the vehicle body frame F in a vehicle width direction is arranged above the power unit P. A seat 33 and a rear cowl 45 both supported by a rear frame F2 connected to a rear part of the vehicle body frame F are arranged behind the fuel tank 2. A tandem step holder 31 is attached to a lower part of the rear frame F2. Further, a tail light unit 29 and a right-left pair of rear blinker units 28 are arranged at a rear end of the rear cowl 45.

A radiator 13 is arranged in front of the cylinder head 14 of the engine E. A first hose 18 extending from a lower end of the radiator 13 and a second hose 16 connected to a cylinder portion of the crank case 15 are connected respectively to a water pump cover 19 arranged behind and below the crank case cover 17. Further, a third hose 46 through which pressurized cooling water is fed upward is connected to the water pump cover 19.

A cover member 42 which covers a drive sprocket fixed to an output shaft of the power unit P is arranged between the crank case cover 17 and the pivot frame F3. The pulsar sensor 37 configuring the crank angle detection device of the present invention is attached at a position above the crank case cover 17 and behind the crank case 15.

Figure 2:
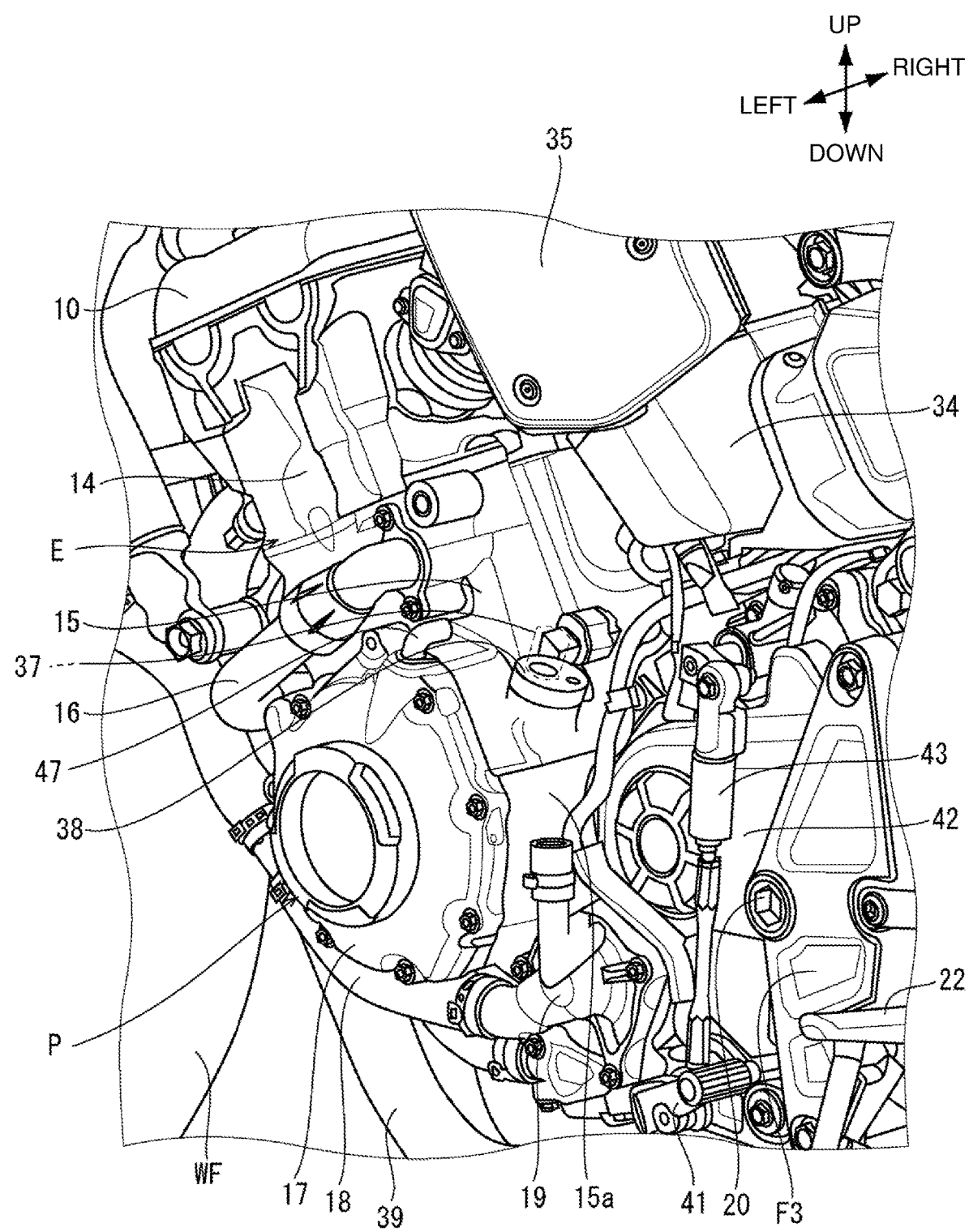
FIG. 2 is a perspective view of a power unit viewing from a rear-upper side of a vehicle body.

FIG. 2 is a perspective view of the power unit P viewing from a left-rear-upper side of the vehicle body. The cylinder-integrated crank case 15 and a lower case 15*a* sandwich and axially support the crank shaft 50 in a rotatable manner. The crank case cover 17 is attached as straddling a connection face between the crank case 15 and the lower case 15*a*. A harness 47 for extracting electric power from a generator (see FIG. 5) synchronously rotating with the crank shaft 50 is connected to an upper part of the crank case cover 17. Further, a shift pedal 41 connected to a shift rod 43 is axially supported in a swingable manner at a front-lower end of the pivot frame F3.

FIG. 2 illustrates a state that the third hose 46 (see FIG. 1) connected to the water pump cover 19 is removed. The crank case cover 17 is arranged as protruding outside the cylinder portion of the engine E in the vehicle width direction. The first hose 18 and the second hose 16 are routed respectively below and above the crank case cover 17 as avoiding interference therewith.

The pulsar sensor 37 of the present invention is fixed to an attachment 38 attached to the crank case 15. Specifically, the pulsar sensor 37 is attached as leaning rearward with respect to the vertical direction at a position inside the crank case cover 17 in the vehicle width direction and behind the crank case cover 17. According to the above arrangement, the pulsar sensor 37 is less likely to be visible from the outside and appearance of the engine E can be enhanced. Further, in the present embodiment, attaching of the third hose 46 causes visibility of the pulsar sensor 37 to be further reduced.

Figure 3:
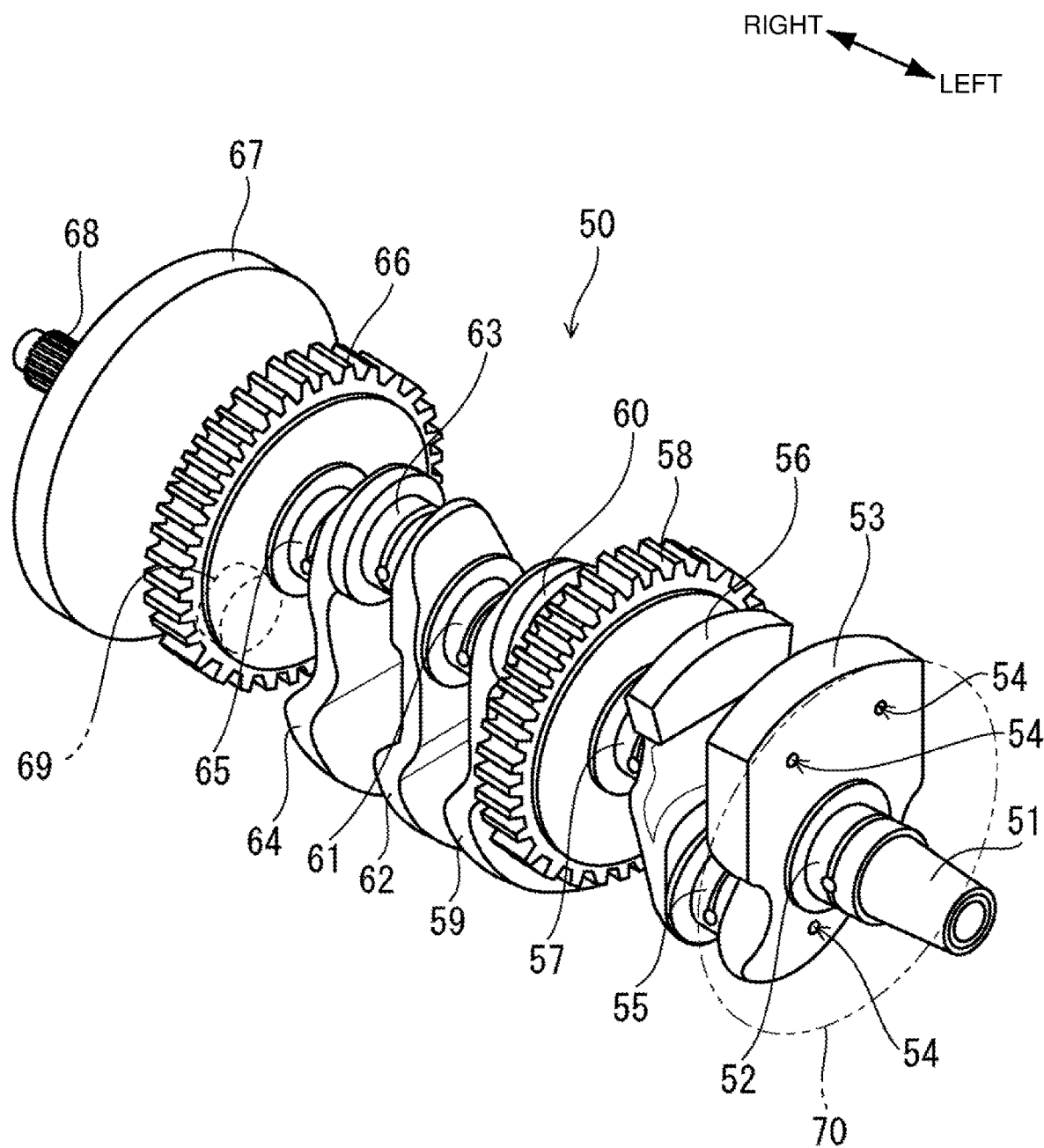
FIG. 3 is a perspective view of a crank shaft.

FIG. 3 is a perspective view of the crank shaft 50. In the crank angle detection device of the present invention, a pulsar ring 70 is attached to a crank web 53 of the crank shaft 50. According to the above, for example, compared to a configuration in which pulsar teeth are formed at an outer circumference of an outer rotor of a generator as a detection portion or a configuration in which pulsar teeth are attached at an outer circumference of a flywheel of a crank shaft, it is possible to achieve downsizing of the crank case and the crank case cover. Further, compared to a configuration in which a pulsar ring is attached to an end of the crank shaft 50, increase of a dimension of the crank shaft in the axial direction can be suppressed.

The crank shaft 50 of the present embodiment includes, between a left end shaft 51 on the left side in the vehicle width direction and a right end shaft 68 on the right side in the vehicle width direction, main journals 52, 57, 61, 65 supported by the crank case 15, crank pins 55, 60, 63, 69 supporting a large end of a con rod, crank webs 53, 56, 59, 62, 64 connecting the main journals and the crank pins and serving as weights to maintain inertia balance of the crank shaft 50, a drive gear 58 driving a balancer, a primary drive gear 66 transmitting drive force of the crank shaft 50 to the transmission, and a flywheel 67 averaging rotation of the crank shaft 50.

In the present embodiment, the pulsar ring 70 is attached to an outer wall face of the crank web 53 arranged at the left end in the vehicle width direction. Specifically, the pulsar ring 70 is fixed to the crank web 53 on the left face thereof in the vehicle width direction using fastening members 82 (see FIG. 4) engaged to three fastening holes 54 formed at the crank web 53. According to the above, regarding the crank shaft 50 including a plurality of crank webs, the pulsar ring 70 can be attached later to the assembled crank shaft 50, so that operational man-hours are reduced and maintenance is facilitated. Further, compared to a configuration in which the pulsar ring is arranged at a crank web around the center of the crank shaft 50, attaching operation and maintenance of the pulsar sensor 37 protruding from an outer wall of the crank case 15 are facilitated.

Figure 4:
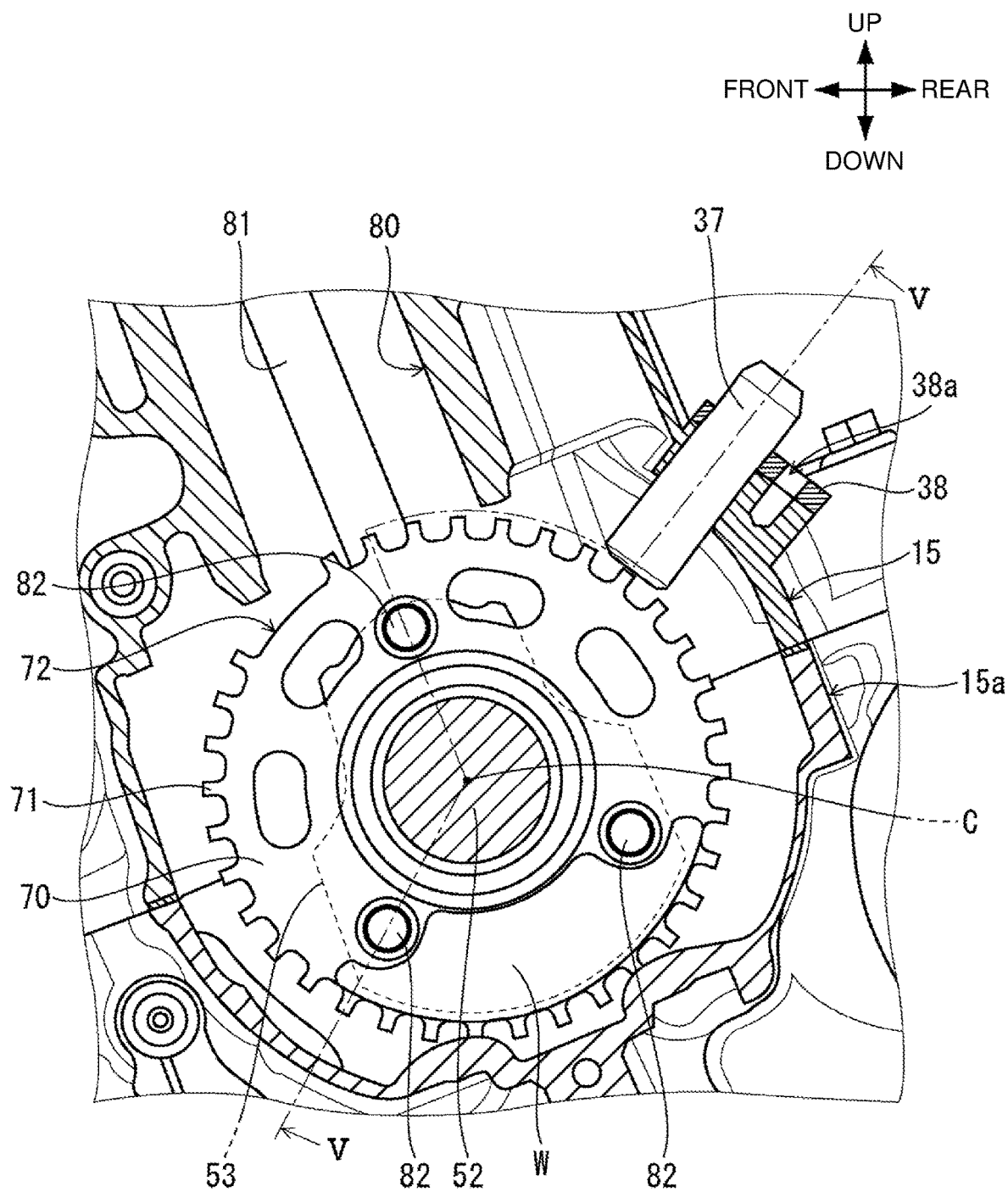
FIG. 4 is a sectional view of the power unit illustrating an attached state of a pulsar ring.

FIG. 4 is a sectional view of the power unit P illustrating an attached state of the pulsar ring 70. A con rod 81 vertically reciprocating inside a cylinder inner wall 80 is axially supported by the crank pin of the crank shaft 50 rotating about a rotational axis C. As shown in FIG. 4, the pulsar ring entirely covers the crank web except for portions containing a lightening hole 75.

As described above, in the present embodiment, the pulsar ring 70 rotating coaxially with the rotational axis C is attached to the crank web 53 at the left end of the crank shaft 50 in the vehicle width direction. Here, to maintain a gap between a left side face of the pulsar ring 70 in the vehicle width direction and a side face of a raised wall supporting the main journal of the crank shaft 50 via a metal bearing at an appropriate value, it is required to reduce thickness of the crank web 53. It is considered thereby that weight reduction of the crank web 53 influences a function to maintain inertia balance of the crank shaft 50.

Here, in the present embodiment, owing to that a weight W is arranged at the pulsar ring 70, the pulsar ring 70 can be attached to the crank web 53 while keeping the function of the crank web 53 to maintain inertia balance of the crank shaft 50. As shown in FIG. 4, the weight W is provided singularly and is disposed at a portion of the pulsar ring opposite to a part of the pulsar ring having no detection teeth.

As illustrated in FIG. 4, the pulsar ring 70 is attached to the crank web 53 by the fastening members 82 such as bolts being screwed in the axial direction. Pulsar teeth 71 serving as a plurality of detection portions, having one tooth-missing portion 72 therebetween, are formed at regular intervals on an outer circumferential face of the pulsar ring 70 formed of a plate-shaped metal member. The pulsar sensor 37 arranged closely to an outer circumference of the pulsar ring 70 is fixed to the crank case 15 using fastening members screwed into through-holes 38a of the attachment 38.

Figure 5:
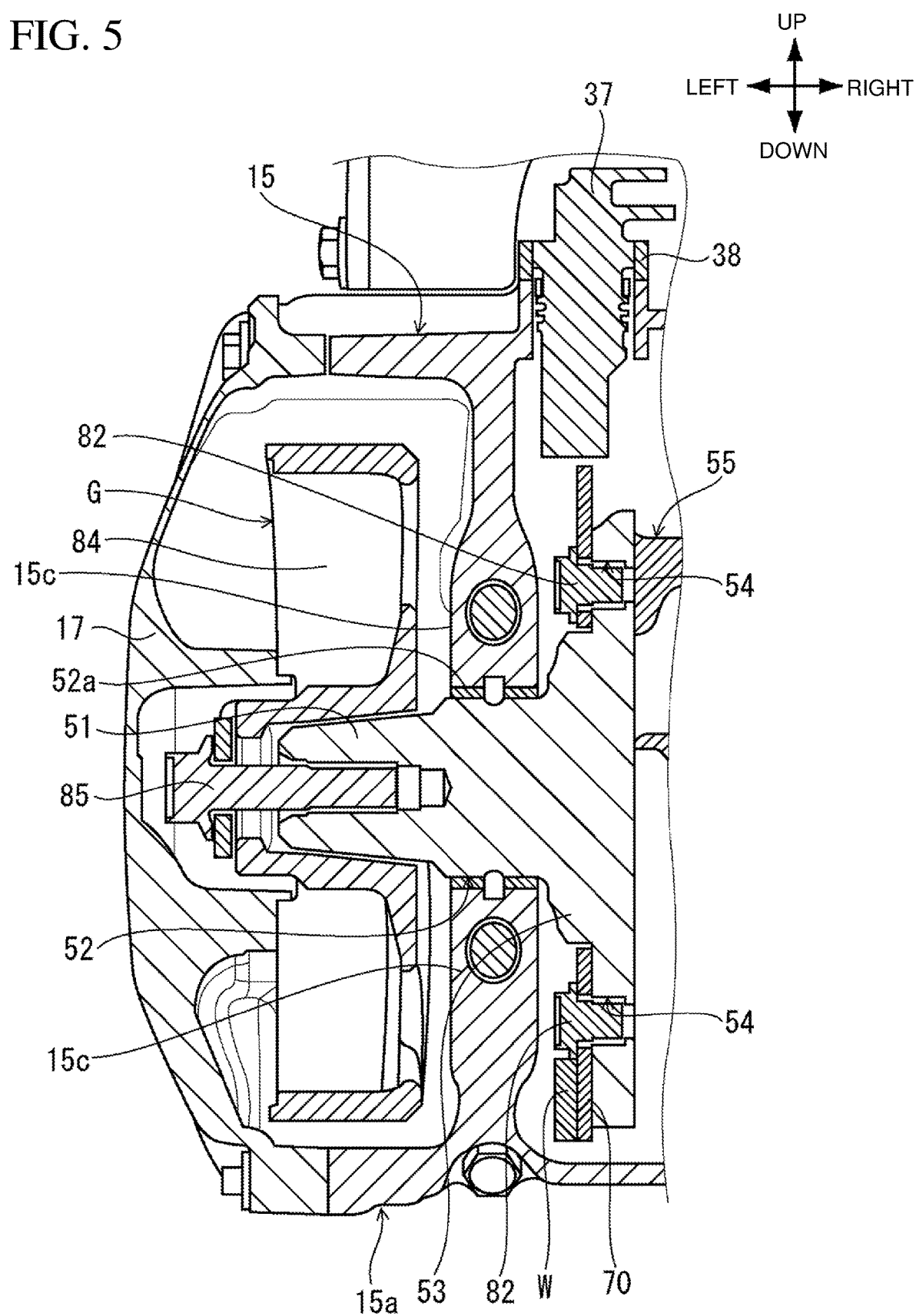
FIG. 5 is a sectional view at line V-V of FIG. 4.

FIG. 5 is a sectional view at line V-V of FIG. 4. The crank journal 52 at the left end of the crank shaft 50 in the vehicle width direction is supported via a crank metal 52a by the raised walls 15c formed respectively at the crank case 15 and the lower case 15a.

In the present embodiment, the pulsar ring 70 is attached to the crank web 53 using the fastening members 82 such as bolts. Accordingly, to maintain a gap between a head part of the fastening member 82 and a side face of the raised wall 15c, thickness of the crank web 53 is required to be reduced. Here, owing to that the weight W is arranged closely to the outer circumference of the pulsar ring 70, inertia weight balance of the crank web 53 is maintained. The weight W is formed by increasing thickness of a part of the pulsar ring 70, and thereby, the weight W can be arranged without changing a profile of the pulsar ring 70. Further, owing to that the thickness of the weight W is increased to a dimension same as the height of the head part of the fastening member 82, the weight of the weight W can be increased by maximally utilizing unused space.

Since the pulsar ring 70 of the present embodiment has more space in the radial direction, for example, compared to a case of being arranged at an end of the crank shaft, the crank web 53 can be enlarged in diameter. Accordingly, weight effect due to the weight W can be enhanced as well as improving detecting accuracy of a crank angle by increasing the number of pulsar teeth 71.

An outer rotor 84 of the generator G is fixed to the left end shaft 51 of the crank shaft 50 using a bolt 85. According to the configuration of the crank angle detection device of the present embodiment, compared to a configuration in which pulsar teeth are arranged at an outer circumference of the outer rotor 84, it is possible to downsize the crank case 15 and the crank case cover 17. Further, compared to a configuration in which a pulsar ring is fixed outside the outer rotor 84 in the axial direction, it is possible to reduce an amount of protrusion of the crank case cover 17 outward in the axial direction.

Figure 6:
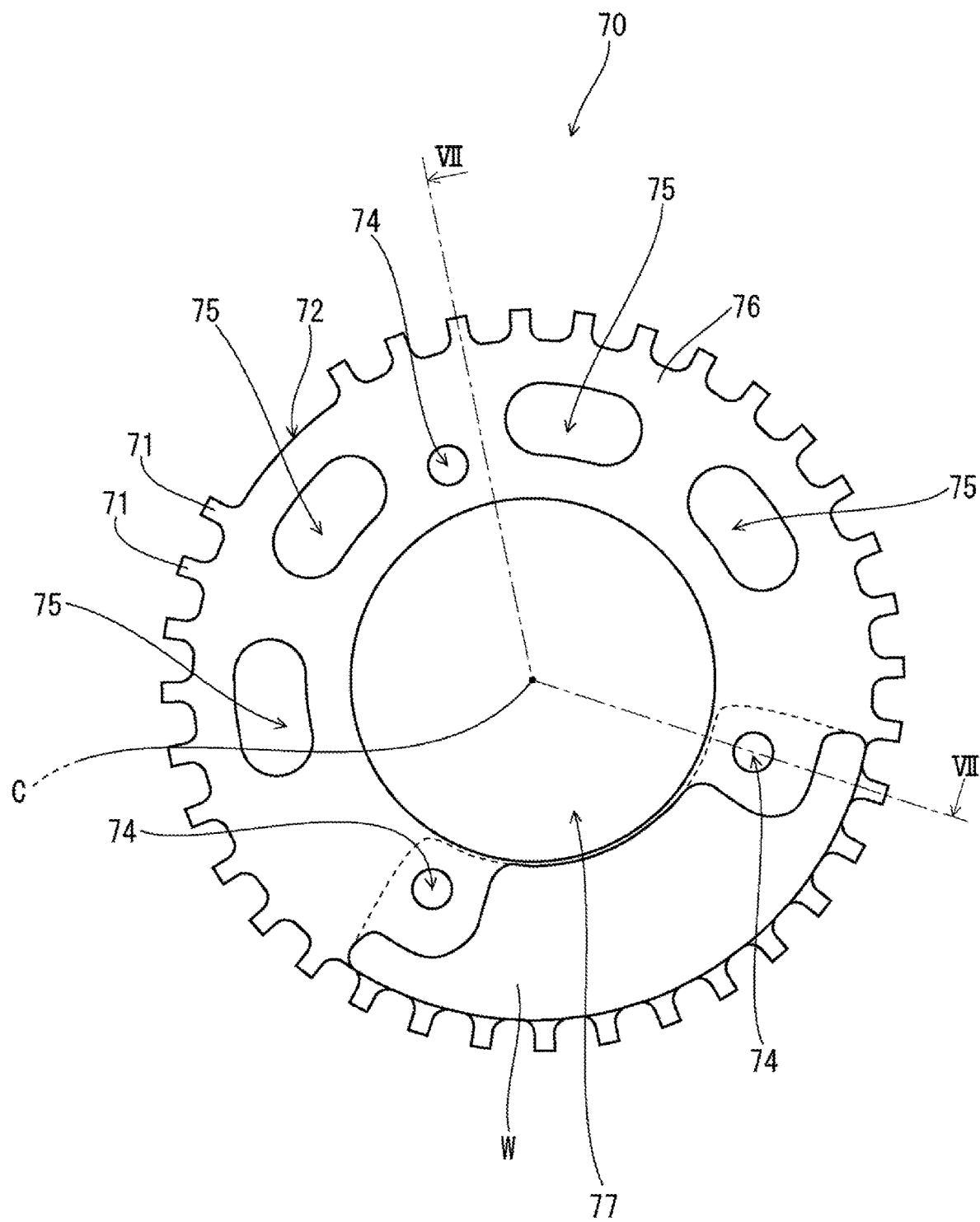
FIG. 6 is a front view of the pulsar ring.

FIG. 6 is a front view of the pulsar ring 70. Three through-holes 74 through which the fastening members 82 pass as being concentrically formed at regular intervals and four elongated-circular lightening holes 75 are formed at a main body 76 of the pulsar ring 70 having a circular opening 77 formed at the center thereof. The weight W is arranged at a position where the lightening hole 75 is not formed and is between the adjacent two through-holes 74 so that the two fastening members 82 are disposed on opposite sides of the weight W. Thus, owing to that a portion having largest inertia force due to the weight W is arranged between the through-holes 74, weight difference with respect to a portion where the lightening hole 75 is formed is enlarged, so that thinning and downsizing of the pulsar ring 70 can be achieved. In FIG. 6, the weight W is arranged within a range on an inner side of a base portion of the pulsar teeth 71. Here, it is also possible that the weight W is extended outward in the radial direction to a position overlapping with the pulsar teeth 71 within a range not to cause influence on crank angle detection.

Figure 7:
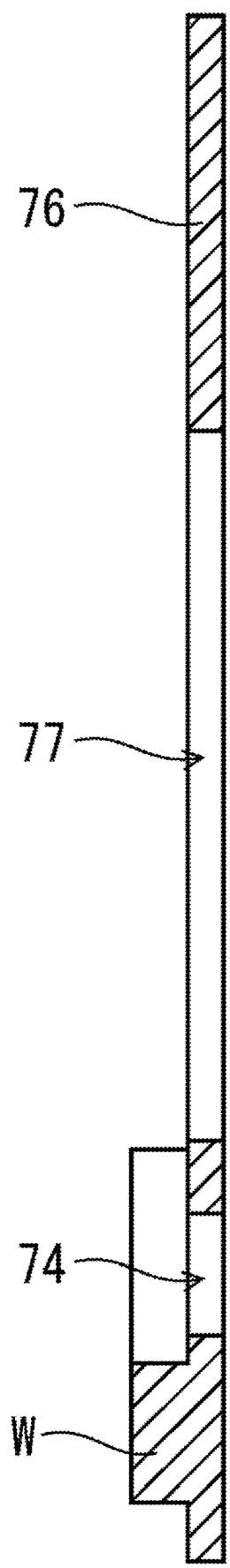
FIG. 7 is a sectional view at line VII-VII of FIG. 6.

FIG. 7 is a sectional view at line VII-VII of FIG. 6. FIG. 7 illustrates a configuration in which the weight W is integrated with the main body 76 of the pulsar ring 70. Here, the whole thereof is formed as a machined component or a sintered component, so that accuracy of dimensions and weight of the pulsar ring 70 can be improved.

Figure 8:
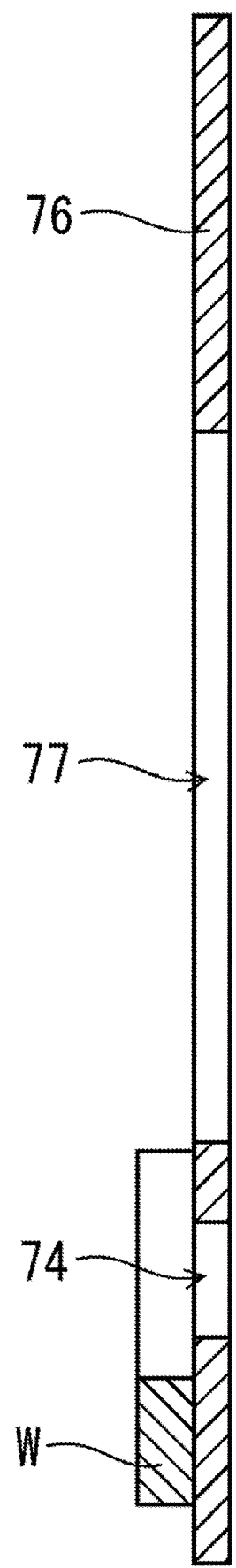
FIG. 8 is a sectional view at line VII-VII of FIG. 6.

FIG. 8 is a sectional view at line VII-VII of FIG. 6. FIG. 8 illustrates a configuration in which the weight W is arranged separately from the main body 76. Here, weight difference can be enlarged by adopting different materials, such that, for example, the main body 76 is formed of a low density material and the weight W is formed of a high density material. Further, when the main body 76 and the weight W are connected by pressure bonding, brazing, or the like, the weight W can be simplified in shape.

When the pulsar ring 70 is jointly fastened using the fastening members 82, the weight W is easily upsized to a range as illustrated by a dotted line in FIG. 6, while the weight W is required to have attachment holes through which the fastening members 82 pass. In the configuration of joint fastening using the fastening members 82, the fastening members 82 may be shaped into disc screws, so that head parts of the fastening members 82 and a surface of the weight W are flush.

Figure 9:
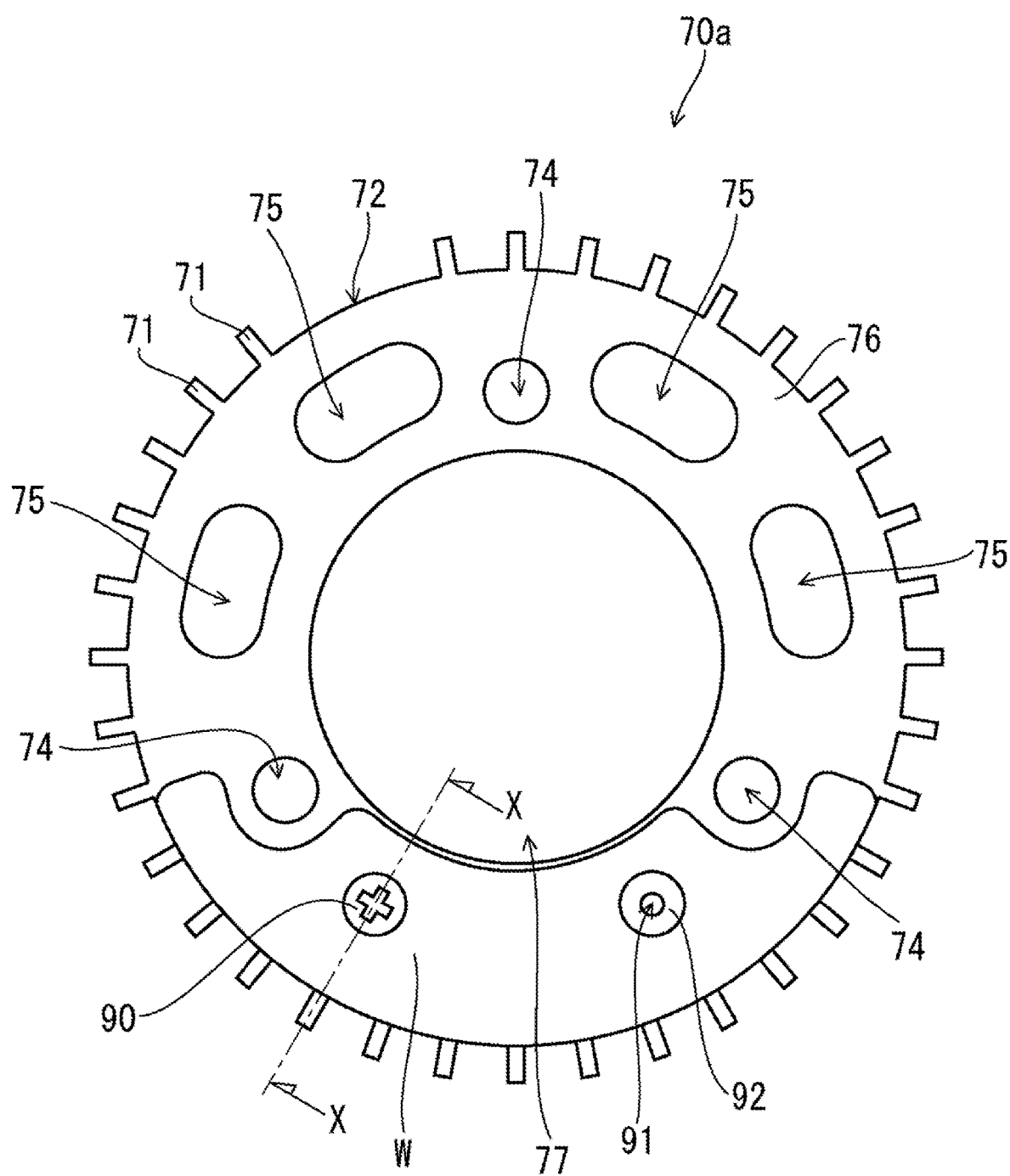
FIG. 9 is a front view of a pulsar ring according to a modified example of the present embodiment.
Figure 10:
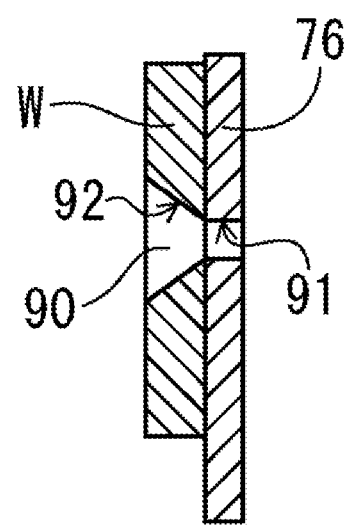
FIG. 10 is a sectional view at line X-X of FIG. 9.

FIG. 9 is a front view of a pulsar ring 70a according to a modified example of the present embodiment. FIG. 10 is a sectional view at line X-X of FIG. 9. The present modified example has a feature that the weight W formed separately from the main body 76 is fastened to the main body 76 using fastening members 90 being different from the fastening members 82. In the present modified example, two female thread holes 91 are formed at the main body 76 and countersinking is performed on the weight W, and then, the main body 76 and the weight W are connected using two disc screws 90. Accordingly, an upper end face of the disc screws 90 are flush with the weight W to prevent occurrence of rotational resistance with oil. Further, the pulsar ring 70a and the weight W can be preassembled and assembling operation to the crank web 53 is facilitated. Here, not limited to the embodiments illustrated in FIG. 6 or 9, a variety of modifications may be applied on outer diameter and thickness of a pulsar ring, shape and arrangement of lightening holes and pulsar teeth, and the like.

As described above, according to the crank angle detection device of the present invention, since the weight W for adjusting inertia balance of the crank shaft 50 is arranged at the pulsar ring 70 fixed to the crank web 53 of the crank shaft 50, the inertia balance of the crank shaft 50 can be adjusted while maintaining length and weight of the crank shaft 50 even when thickness of the crank web 53 is reduced for the pulsar ring 70 being attached thereto. Accordingly, owing to that the pulsar ring 70 is arranged at a position on the inner side of the crank shaft end without increasing engine dimensions in the crank shaft direction and the pulsar sensor 37 is arranged at a position on the inner side of the crank shaft end, the crank case 15 and the crank case cover 17 can be prevented from being upsized and the appearance of the engine E can be enhanced.

Here, not limited to the abovementioned embodiments, a variety of modifications may be applied on a configuration of a motorcycle, a configuration of an engine constituting a power unit, shape and structure of a crank shaft, shape and number of crank webs, shape and material of a pulsar ring, number and shape of fastening members, shape and material of a weight, and the like. Further, not limited to a motorcycle, the crank angle detection device of the present invention may be adopted to a multi-cylinder engine to be mounted on a straddle type three-wheeler or four-wheeler.

REFERENCE SIGNS LIST

1 Motorcycle
15 Crank case
50 Crank shaft
37 Pulsar sensor (Sensor)
53 Crank web
70 Pulsar ring
71 Pulsar teeth (detection portion)
74 Through-hole
75 Lightening hole
82 Fastening member
E Engine
P Power unit
W Weight

What is claimed is:

1. A crank angle detection device for an engine, comprising:
   a pulsar ring including a main body with a plurality of detection portions provided on an outer portion of the main body and an opening provided at a center of the main body configured to receive a portion of a crankshaft of an engine therethrough, the pulsar ring being configured to be fixed to a crank web of the crankshaft and to rotate coaxially with the crank shaft;
   a sensor configured to detect a passage state of the detection portions; and
   a weight for adjusting inertia balance of the crank shaft which is arranged at the pulsar ring, wherein
   the main body of the pulsar ring including a first portion having at least one lightening hole defined therein and a second portion at which the weight is arranged, the second portion having no lightening holes defined therein, and
   the weight is arranged between two fastening members that fasten the pulsar ring to the crank web so that the two fastening members are on opposite sides of the weight, and the weight extends radially toward a vicinity of the detection portions.

2. The crank angle detection device for an engine according to claim 1, wherein the pulsar ring is fixed to the crank web arranged close to an end of the crank shaft in an axial direction.

3. The crank angle detection device for an engine according to claim 2, wherein the weight is integrated with the pulsar ring as a part of the pulsar ring having increased thickness.

4. The crank angle detection device for an engine according to claim 1, wherein the weight is integrated with the pulsar ring as a part of the pulsar ring having increased thickness.

5. The crank angle detection device for an engine according to claim 1, wherein the weight is integrated with the pulsar ring.

6. The crank angle detection device for an engine according to claim 5, wherein the weight is formed of a material or a member different from that of the pulsar ring.

7. The crank angle detection device for an engine according to claim 1, wherein a head part of each fastening member and a surface of the weight are flush in a state that the pulsar ring is fixed to the crank web.

8. The crank angle detection device for an engine according to claim 7,
wherein through-holes allowing the fastening members to pass therethrough are formed in the pulsar ring on a concentric circle at regular intervals.

9. The crank angle detection device for an engine according to claim 1,
wherein through-holes configured to receive the fastening members therethrough are formed in the pulsar ring on a concentric circle at regular intervals.

10. The crank angle detection device according to claim 1,
wherein the weight is provided singularly and is disposed at a portion of the pulsar ring opposite to a part of the pulsar ring having no detection portions.

11. The crank angle detection device according to claim 1, wherein a surface of the crank web is entirely covered by the pulsar ring except at the at least one lightening hole.

12. The crank angle detection device according to claim 1,
wherein the weight partially overlaps the detection portions.

13. The crank angle detection device according to claim 1,
Wherein, the first and second portions of the main body of the pulsar ring are disposed opposite to each other across the central opening of the pulsar ring main body.

14. The crank angle detection device according to claim 1, wherein
The weight is connected to the main body of the pulsar ring separately from the fastening members that fasten the pulsar ring to the crank web.

* * * * *